United States Patent
Gu

(10) Patent No.: US 10,429,947 B2
(45) Date of Patent: Oct. 1, 2019

(54) OPTICAL NAVIGATION MECHANISM CAPABLE OF DYNAMICALLY LEARNING DIFFERENT MATERIALS OF DIFFERENT WORKING SURFACES

(71) Applicant: PixArt Imaging Inc., Hsin-Chu (TW)

(72) Inventor: Ren-Hau Gu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 120 days.

(21) Appl. No.: 15/673,420

(22) Filed: Aug. 10, 2017

(65) Prior Publication Data

US 2018/0232065 A1 Aug. 16, 2018

(30) Foreign Application Priority Data

Feb. 15, 2017 (TW) .............................. 106104837 A

(51) Int. Cl.
*G06F 3/03* (2006.01)
*G06F 3/0354* (2013.01)

(52) U.S. Cl.
CPC .......... *G06F 3/0317* (2013.01); *G06F 3/0308* (2013.01); *G06F 3/03543* (2013.01)

(58) Field of Classification Search
CPC ... G06F 3/03543; G06F 3/0308; G06F 3/0317
See application file for complete search history.

(56) References Cited

U.S. PATENT DOCUMENTS

| | | | |
|---|---|---|---|
| 2012/0100890 A1* | 4/2012 | Kimura | H04N 9/30 455/556.1 |
| 2012/0127076 A1* | 5/2012 | Song | G06F 3/0317 345/166 |
| 2015/0294466 A1* | 10/2015 | Johnston | A61B 1/00057 348/67 |
| 2015/0357360 A1* | 12/2015 | Tian | H01L 27/14605 250/208.2 |
| 2018/0263489 A1* | 9/2018 | Gavaris | G01N 21/553 |

* cited by examiner

*Primary Examiner* — Abbas I Abdulselam
(74) *Attorney, Agent, or Firm* — Winston Hsu

(57) ABSTRACT

A method for dynamically learning a material of a working surface on which an optical navigation device is moving, includes: using light emitting unit (s) to emit light ray (s) to the surface so as to generate image(s) on an image sensor; estimating and calculating average offset(s) of image(s) of sensing pixel(s) of the image sensor according to at least one image motion information sensed by the sensing pixel(s) during a specific time; and, dynamically determining whether the image value(s) sensed by the sensing pixel (s) correspond to a fixed pattern or correspond to a feature image of the device moving on the surface according to the average offset(s) and a threshold.

13 Claims, 2 Drawing Sheets

OPTICAL NAVIGATION MECHANISM CAPABLE OF DYNAMICALLY LEARNING DIFFERENT MATERIALS OF DIFFERENT WORKING SURFACES

BACKGROUND OF THE INVENTION

1. Field of the Invention

The invention relates to an optical navigation mechanism, and more particularly to a method and an optical navigation device capable of dynamically learning materials of different working surfaces on which the optical navigation device is moving.

2. Description of the Prior Art

Generally speaking, conventional optical mouse devices comprise various kinds of optical mouse devices such as a kind of optical mouse device implemented with bright field technique and another kind of laser mouse device implemented with laser light detection and dark field techniques. In general, a conventional optical mouse device implemented with bright field technique cannot be used for stably and accurately detecting its movement on a smooth working surface such as a glass surface due to different light reflection characteristics when it is operated on the smooth working surface. In order to be applicable on the smooth glass working surface, a conventional optical mouse device implemented with laser light detection and dark field techniques is usually adopted to detect particles on the glass working surface so as to estimate the movement of the conventional optical mouse device. However, the laser light detection technique inevitably consumes more power, and thus this does not meet user requirements. No mechanisms capable of saving power and stably/accurately detecting movement of an optical mouse device operated on a smooth working surface are provided nowadays.

SUMMARY OF THE INVENTION

Therefore one of the objectives of the invention is to provide a method and an optical navigation device capable of dynamically learning materials of different working surfaces on which the optical navigation device is moving, to achieve effective power saving and to stably and accurately detect movement of the optical navigation device operated on a smooth working surface, so as to solve the above-mentioned problems.

According to embodiments of the invention, a method capable of dynamically learning a material of a working surface on which an optical navigation device is moving is provided. The method comprises: utilizing at least one light emitting unit to emit at least one light ray to the working surface to reflect and generate image(s) on an image sensor; estimating and calculating at least one average image offset sensed by at least one sensing pixel of the image sensor according to at least one image motion information sensed by the at least one sensing pixel of the image sensor during a specific time; and dynamically determining whether at least one image value sensed by the at least one sensing pixel corresponds to a fixed pattern or a feature image associated with movement of the optical navigation device according to the at least one average image offset and a threshold.

According to the embodiments, an optical navigation device capable of dynamically learning a material of a working surface on which the optical navigation device is moving is provided. The optical navigation device comprises an image sensor, at least one light emitting unit, and a processor. The at least one light emitting unit is configured for emitting at least one light ray to the working surface to reflect and generate image(s) on the image sensor. The processor is coupled to the image sensor and configured for: estimating and calculating at least one average image offset sensed by at least one sensing pixel of the image sensor according to at least one image motion information sensed by the at least one sensing pixel of the image sensor during a specific time; and for dynamically determining whether at least one image value sensed by the at least one sensing pixel corresponds to a fixed pattern or a feature image associated with movement of the optical navigation device according to the at least one average image offset and a threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
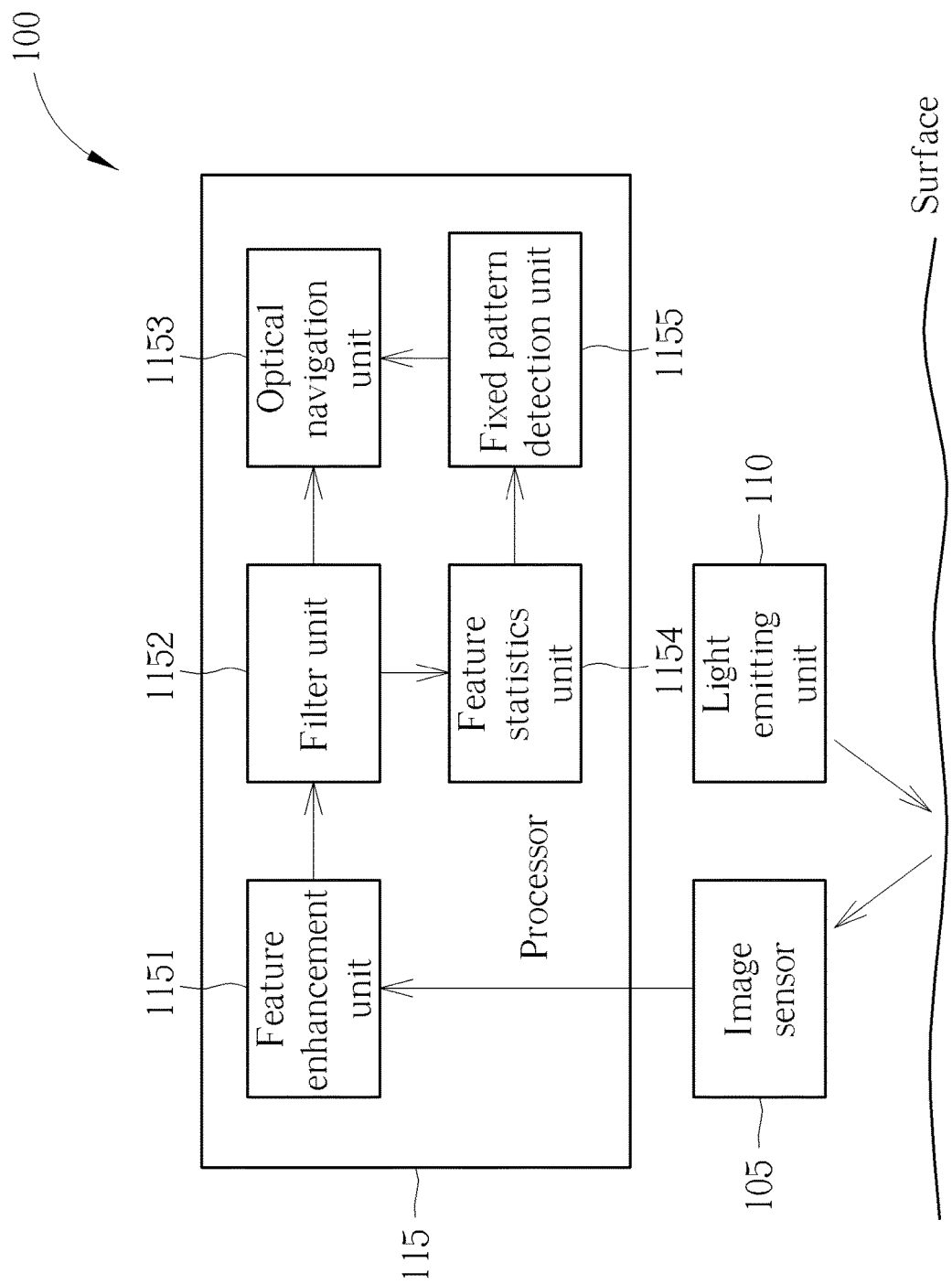
FIG. 1 is a block diagram of an optical navigation device according to an embodiment of the invention.
Figure 2:
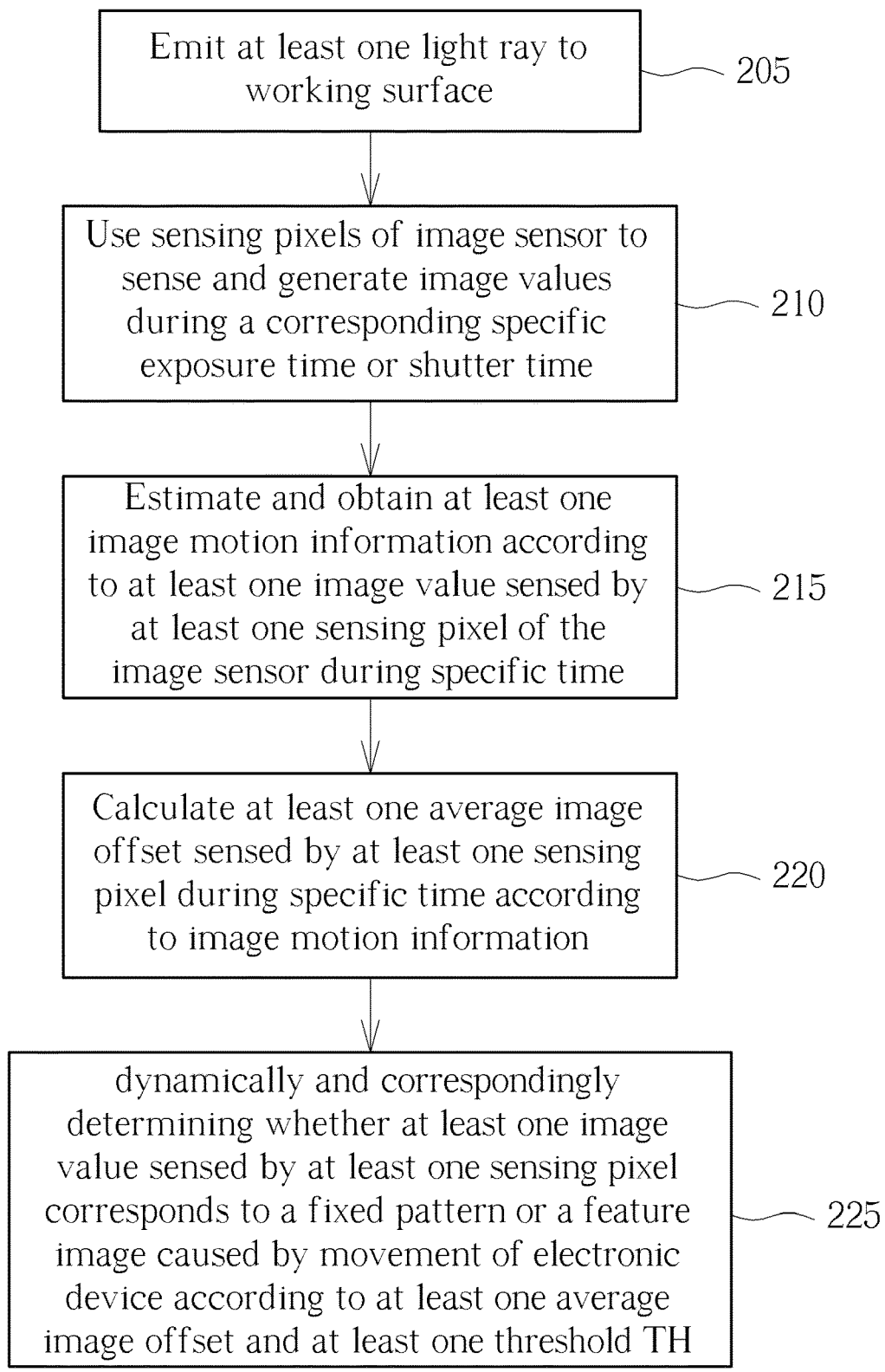
FIG. 2 is a diagram illustrating a flowchart of the operations of the optical navigation device as shown in FIG. 1.

FIG. 1 is a block diagram of an electronic device 100 according to an embodiment of the invention. FIG. 2 is a diagram illustrating a flowchart of the operations of the electronic device 100 as shown in FIG. 1. In practice, the electronic device 100 is a portable optical navigation device such as an optical mouse device (but not limited). The electronic device 100 is capable of dynamically learning the material of a working surface on which the electronic device 100 is placed/operated and moving. When the electronic device 100 is placed on a working surface first time or the electronic device 100 is initially enabled/activated, the electronic device 100 during a first time period (learning period) can be arranged for learning the material of such working surface on which the device 100 is currently placed. When the device 100 is actually used, the device 100 during a second time period is arranged for calibrating sensed images according to the learned information from the material. This can significantly improve the accuracy and stability of the electronic device 100 when the electronic device 100 is actually used. The electronic device 100 is applicable to be used and operated on different working surfaces having different materials. That is, the electronic device 100 works well on either a smooth working surface or a rough working surface.

In general, when a conventional optical mouse device is used on a smooth working surface such as a glass surface, the accuracy and stability of mouse position tracking of the conventional optical mouse device becomes worse due to the characteristics of light reflection coefficients of the smooth working surface. For example, a user may just slightly move the conventional optical mouse device on the glass surface in a direction, but however the corresponding mouse position displayed on a display device will be randomly and significant shifted or changed. Thus, in order to be applicable to the smooth surface, the conventional optical mouse device is usually implemented by using laser light emission and dark field techniques without using light-emitting diode and bright field techniques. However, compared to the light-emitting diode and bright field techniques, using the laser light emission and dark field techniques inevitably consume much power. This does not meet user's requirements for the portable electronic devices.

Accordingly, in order to solve the above-mentioned problems, in the embodiments, the electronic device 100 is arranged to adopt the light-emitting diode and bright field techniques to save more power. In addition, in order to be applicable to working surface having smooth materials such as glass material or other smooth materials, the electronic device 100 is also arranged to dynamically learn the materials of different working surfaces so as to determine whether the sensed image values correspond to feature images of movement of electronic device 100 or a fixed pattern image caused by the optical system itself. Then, the electronic device 100 calibrates or adjusts the sensed image values for optical mouse position tracking according to the decision results, so as to significantly improve the accuracy and stability of optical mouse position tracking. Compared to the conventional laser mouse device, the electronic device 100 consumes less power, and it is easier to meet the user's requirements for portable electronic devices.

It should be noted that the feature image in the embodiments is defined as an image in the images correspondingly sensed by an image sensor wherein such image (feature image) can be used for stably and accurately estimating movement of an optical navigation device on a working surface. The fixed pattern image in the embodiments is defined as an image in the images correspondingly sensed by an image sensor wherein such image (fixed pattern image) cannot be used for stably and accurately estimating movement of an optical navigation device on a working surface. That is, the fixed pattern image can be regarded as noise for the optical navigation tracking operation. For example, different noises may be caused by different materials of different working surfaces. The image value of a sensing pixel in a sensed image sensed by the image sensor may correspond to the feature image of an optical navigation device or correspond to fixed pattern noise. The electronic device 100 in the embodiments can be arranged for determining whether the image value of each sensing pixel corresponds to the feature image of electronic device 100 or fixed pattern noise, and for calibrating the image value(s) of one or multiple sensing pixels which correspond to fixed pattern noise, so as to improve the accuracy and stability of motion estimation for the optical navigation tracking operation. The embodiments of electronic device 100 are described in the following.

The electronic device 100 at least includes an image sensor 105, at least one light emitting unit 110, and a processor 115. The at least one light emitting unit 110 such as a light emitting diode is used for emitting at least one light ray to the working surface (Step 205), to reflect and generate image(s) on the image sensor 105. The surface can be a smooth surface or a non-smooth surface. The image sensor 100 for example is an image sensor array and includes M*N sensing pixels. Each sensing pixel can be used to sense and generate an image value during a corresponding specific exposure time or shutter time. The processor 115 is coupled to the image sensor 105 and used for estimating and calculating to obtain at least one image motion information according to at least one image value sensed by at least one sensing pixel of the image sensor 100 during a specific time (Step 215). In addition, the processor 115 is arranged for calculating at least one average image offset sensed by the at least one sensing pixel during the specific time according to the image motion information (Step 220). In addition, the processor 115 is arranged for dynamically and correspondingly determining whether the at least one image value sensed by the at least one sensing pixel corresponds to a fixed pattern or a feature image caused by movement of the electronic device 100 according to the at least one average image offset and at least one threshold TH (Step 225). By dynamically deciding whether at least one image sensed by the at least one sensing pixel corresponds to the fixed pattern or the feature image, the processor 115 dynamically learns the material of the working surface. In addition, a specific algorithm scheme can be further employed to decide whether the image value of each sensing pixel (or image values of a set of sensing pixels) is/are feature image (s) or fixed pattern (s). Accordingly, after that, the optical navigation tracking operation can be performed by modifying the image values of the sensing pixels which correspond to fixed patterns and then adopting/referencing the modified image values to complete such tracking operation. Thus, this can avoid referring to the fixed patterns to perform optical navigation tracking, so as to significantly improve the accuracy and stability of optical navigation tracking operation when the device 100 is used on the smooth surface.

The processor 115 comprises a feature enhancement unit 1151, a filter unit 1152, an optical navigation unit 1153, a feature statistics unit 1154, and a fixed pattern detection unit 1155. The above-mentioned units can be implemented by adopting software, hardware, or a combination of software and hardware. Taking an example of software, these units can be comprised by a specific program code which can be stored in a nonvolatile memory. The processor 115 can perform the operations and functions of these units by loading and executing the specific program code. Taking an example of hardware, these units can be implemented by circuit elements respectively.

In the embodiment, the scheme for improving the accuracy and stability of optical mouse device moving on a smooth surface comprises two parts including a main part and an auxiliary part. In the main part, the feature statistics unit 1154 and the fixed pattern detection unit 1155 are employed to operate during the above-mentioned first time period (learning time) to dynamically learn the material of a current working surface, and then the optical navigation unit 1153 is employed to operate during the second time period to calibrate the sensed images in accordance with the information learned from the material when the electronic device 100 is actually used for optical navigation tracking, so as to improve the accuracy and stability of the electronic device 100 when being actually used for optical navigation tracking. In the auxiliary part, the feature enhancement unit 1151 is employed to enhancing the features of original raw images. In practice, the feature enhancement unit 1151 can be arranged for improving the number of resolution bits of an analog-to-digital converter to enhance the features; for example, the feature enhancement unit 1151 can be arranged to increase two or three resolution bits. in addition, the feature enhancement unit 1151 can be arranged for subtracting direct-current (DC) values from the original raw images, multiplying the remaining alternating-current (AC) value with a specific gain value, and finally summing the DC values and multiplication results so as to enhance the features. In a preferred embodiment, the above-mentioned mechanisms can be simultaneously adopted to enhance the features. In another embodiment, the processor 115 may exclude the feature enhancement unit 1151. That is, the feature enhancement unit 1151 is optional.

The filter unit 1152 comprises at least one image filter. For example, the filter unit 1152 may comprise two image filters to process the image value of each sensing pixel for a sensed image. The first image filter is arranged for performing edge suppression operation based on eight different directions to generate eight edge-suppressed images and for selecting an image having a weaker feature from the edge-suppressed images. The second image filter is arranged for performing the edge suppression operation based on eight different directions to generate the eight edge-suppressed images and for selecting an image having a stronger feature from the edge-suppressed images. When it is decided that an image has more or stronger feature images, the filter unit 1152 is arranged for selecting an image value generated and outputted from the first image filter as the pixel value of a current pixel. Alternatively, when it is decided that an image has less or weaker feature images, the filter unit 1152 is arranged for selecting an image value generated and outputted from the second image filter as the pixel value of the current pixel.

Additionally, if the electronic device 100 has decided that the material of a current working surface is clean (e.g. less image values of fixed pattern exist), the filter unit 1152 can be arranged for selecting an image value generated and outputted from the second image filter as the pixel value of the current pixel. If the electronic device 100 has decided that the material of the current working surface is dirty (e.g. more image values of fixed pattern exist), the filter unit 1152 can be arranged for selecting an image value generated and outputted from the first image filter as the pixel value of the current pixel. That is, the filter unit 1152 is able to dynamically select an image value having a stronger feature or an image value having a weaker feature as the image value of a sensing pixel in response to the strong/weak feature of the sensed feature image and/or the difference of information learned from the material of a working surface.

The processor 115 then is able to determine whether an image value of a sensing pixel (or image values of multiple sensing pixels) in a sensed image has been shifted or not. For example, the operation for determining whether the image value of a sensing pixel has been shifted or not can be performed based on the range of each sensing pixel. The operation for determining whether the image values of multiple sensing pixels have been shifted or not can be performed based on the range of 32*32 sensing pixels (but not limited). If the image value(s) has/have been shifted, the processor 115 is arranged for calculating the value of an average image offset for the image value(s) of one or multiple sensing pixels during a specific time wherein the average image offset indicates the intensity value of image for the average offset. The processor 115 then is arranged for comparing the value of average image offset with the above-mentioned threshold TH by using the fixed pattern detection unit 1155 to dynamically determine whether the image value(s) of one or multiple sensing pixels correspond(s) to a fixed pattern or a feature image of the electronic device 100. When the value of average image offset is smaller than the threshold TH, the processor 115 determines that the image value(s) correspond(s) to the fixed pattern. Alternatively, when the value of average image offset is larger than the threshold TH, the processor 115 determines that the image value(s) correspond(s) to the feature image.

The optical navigation unit 1153 of electronic device 100 can be employed to operate in accordance with the detection results determined by the fixed pattern detection unit 1155 for one or multiple sensing pixels. When it is determined that the image value(s) sensed by one or multiple sensing pixels correspond(s) to a feature pattern, the processor 115 can be arranged for performing a calibration operation upon the image value(s) sensed by one or multiple sensing pixels to generate at least one calibrated image pixel value. The processor 115 then performs motion estimation of optical navigation tracking according to the at least one calibrated image pixel value to stably and accurately tracking the movement of electronic device 100 on the current working surface. In practice, the calibration operation can be used for correspondingly subtracting the value of the average image offset from the image value(s) sensed by one or multiple sensing pixels to generate the at least one calibrated image pixel value. However, this is not meant to be a limitation. In addition, when calibrating the image value(s), the processor 115 can be also arranged for using/controlling the optical navigation unit 1153 to assign at least one corresponding bit to replace the image value(s) sensed by the one or multiple sensing pixels if determining that such image value(s) correspond(s) to a fixed pattern. For example, bit '1' or bit '0' can be assigned to replace the image value(s) sensed by the one or multiple sensing pixels so that the optical navigation unit 1153 can be immediately aware that the image value(s) of sensing pixel(s) correspond(s) to a fixed pattern and it is not appropriate to use the image value(s) to perform motion estimation for optical navigation tracking when the optical navigation unit 1153 refers to the bit '1' or bit '0'. In addition, the operation for assigning bit '1' or bit '0' to replace the image value(s) sensed by the one or multiple sensing pixels also provides an advantage that the optical navigation unit 1153 can dynamically learn the style of fixed pattern noise on the whole image range according to the assigned bits '1' or bits '0'.

It should be noted that the above-mentioned threshold TH can be configured as different values in response to different sensing pixels. That is, the processor 115 is arranged for respectively adopting different values of threshold TH to perform comparison of the image values of different sensing pixels with the different values of threshold TH. Further, the material of a working surface, which is dynamically learned by the electronic device 100, is not meant to be a limitation. The electronic device 100 can be used for dynamically learning the materials of all possible working surfaces including clean surfaces, dirty surfaces, and other different surfaces.

Additionally, the electronic device 100 at the factory can be placed on a completely clean surface (theoretically having no particles or no micro particles) to perform test of motion estimation. The processor 115 can be arranged to use the feature statistics unit 1154 to estimate the value of average image offset associated with the image value(s) of one or multiple sensing pixels. Alternatively, the processor can be arranged to estimate the value of average image offset for the image value of each sensing pixel during a specific time. The value of average image offset can represent the intensity value of fixed pattern noise caused by the optical system. The processor 115 can record and store the intensity value of fixed pattern noise in a non-volatile memory when performing test at the factory. After that, when the electronic device 100 is actually used for optical navigation tracking, the processor 115 can be arranged to load the intensity value of fixed pattern noise from the non-volatile memory, calibrate the image value(s) sensed by corresponding sensing pixel (s) according to such intensity value, and finally perform motion estimation for optical navigation tracking according to the calibrated image value(s).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method capable of dynamically learning a material of a working surface on which an optical navigation device is moving, comprising:

utilizing at least one light emitting unit to emit at least one light ray to the working surface to reflect and generate image (s) on an image sensor;

estimating and calculating at least one average image offset sensed by at least one sensing pixel of the image sensor according to at least one image motion information sensed by the at least one sensing pixel of the image sensor during a specific time; and dynamically determining whether at least one image value sensed by the at least one sensing pixel corresponds to a fixed pattern or a feature image associated with movement of the optical navigation device according to the at least one average image offset and a threshold.

2. The method of claim 1, wherein the dynamically determining step comprises:

comparing the at least one average image offset with the threshold to dynamically determine whether the at least one image value sensed by the at least one sensing pixel corresponds to the fixed pattern or the feature image.

3. The method of claim 2, wherein the comparing and determining step comprises:

determining that the at least one image value corresponds to the fixed pattern when the at least one average image offset is smaller than the threshold; and determining that the at least one image value corresponds to the feature image when the at least one average image offset is larger than the threshold.

4. The method of claim 1, further comprising:

performing a calibration operation upon the at least one image value sensed by the at least one sensing pixel to generate at least one calibrated image pixel value when determining that the at least one image value sensed by the at least one sensing pixel corresponds to the fixed pattern; and performing a motion estimation to track the movement of the optical navigation device on the working surface according to the at least one calibrated image pixel value.

5. The method of claim 4, wherein the step of performing the calibration operation comprises:

correspondingly subtracting the at least one average image offset from the at least one image value sensed by the at least one sensing pixel to generate the at least one calibrated image pixel value.

6. The method of claim 4, wherein the step of performing the calibration operation comprises:

assigning at least one corresponding bit to replace the at least one image value sensed by the at least one sensing pixel if it is determined that the at least one image value corresponds to the fixed pattern.

7. An optical navigation device capable of dynamically learning a material of a working surface on which the optical navigation device is moving, comprising:

an image sensor;

at least one light emitting unit, configured for emitting at least one light ray to the working surface to reflect and generate image(s) on the image sensor; and a processor, coupled to the image sensor, configured for estimating and calculating at least one average image offset sensed by at least one sensing pixel of the image sensor according to at least one image motion information sensed by the at least one sensing pixel of the image sensor during a specific time, and for dynamically determining whether at least one image value sensed by the at least one sensing pixel corresponds to a fixed pattern or a feature image associated with movement of the optical navigation device according to the at least one average image offset and a threshold.

8. The optical navigation device of claim 7, wherein the processor is arranged for comparing the at least one average image offset with the threshold to dynamically determine whether the at least one image value sensed by the at least one sensing pixel corresponds to the fixed pattern or the feature image.

9. The optical navigation device of claim 8, wherein the processor is arranged for determining that the at least one image value corresponds to the fixed pattern when the at least one average image offset is smaller than the threshold; and, the processor is arranged for determining that the at least one image value corresponds to the feature image when the at least one average image offset is larger than the threshold.

10. The optical navigation device of claim 7, wherein the processor is arranged for performing a calibration operation upon the at least one image value sensed by the at least one sensing pixel to generate at least one calibrated image pixel value when determining that the at least one image value sensed by the at least one sensing pixel corresponds to the fixed pattern; and, the processor is arranged for performing a motion estimation to track the movement of the optical navigation device on the working surface according to the at least one calibrated image pixel value.

11. The optical navigation device of claim 10, wherein the processor is arranged for correspondingly subtracting the at least one average image offset from the at least one image value sensed by the at least one sensing pixel to generate the at least one calibrated image pixel value.

12. The optical navigation device of claim 10, wherein the processor is arranged for assigning at least one corresponding bit to replace the at least one image value sensed by the at least one sensing pixel if it is determined that the at least one image value corresponds to the fixed pattern.

13. The optical navigation device of claim 7 is an optical mouse device.

* * * * *